Oct. 26, 1971    D. A. BRACKMAN ET AL    3,614,930
RATE CHANGE DEVICES AND PARTICULARLY IMPROVED ARMING DEVICES
Filed Dec. 23, 1968    3 Sheets-Sheet 2
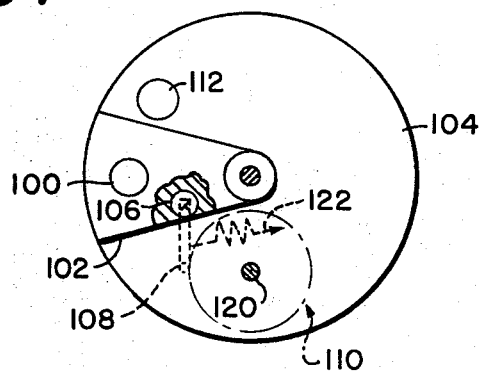
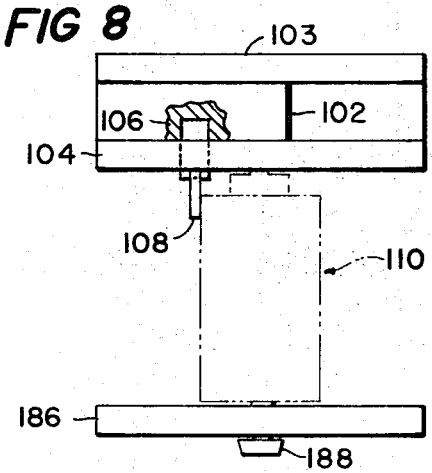
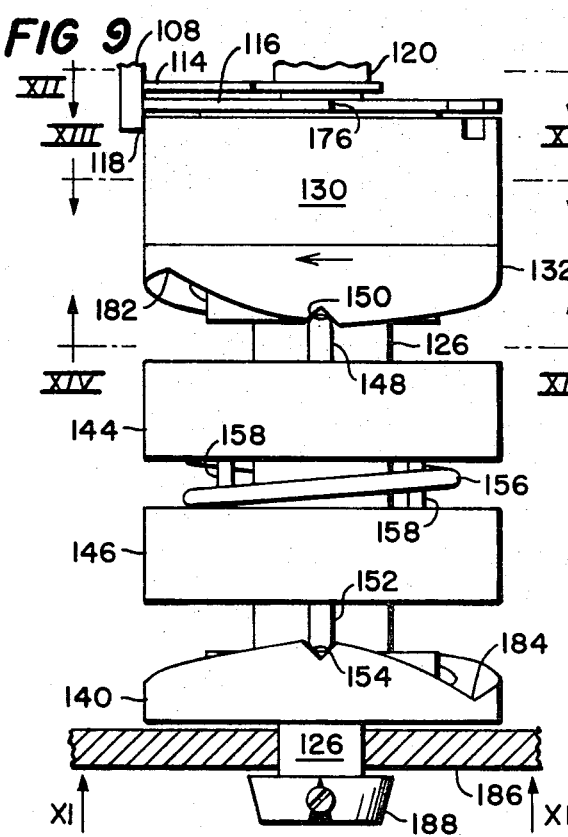
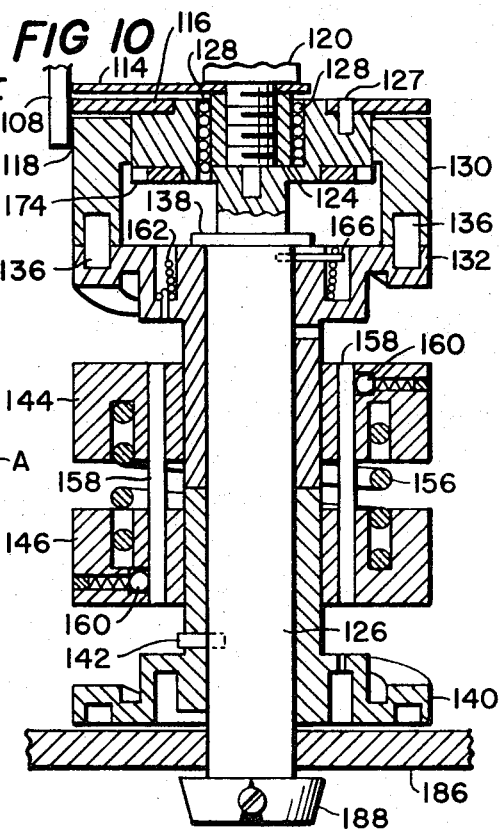
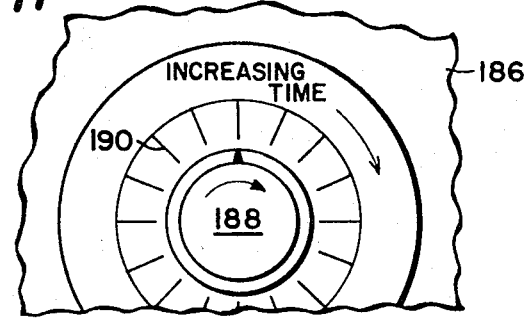
INVENTORS.
DONALD A. BRACKMAN
JOHN D. YORK
BY
ATTORNEY.

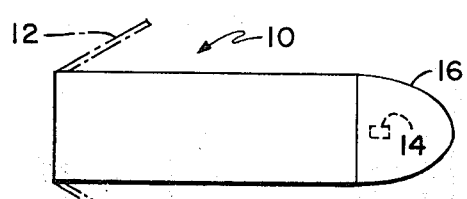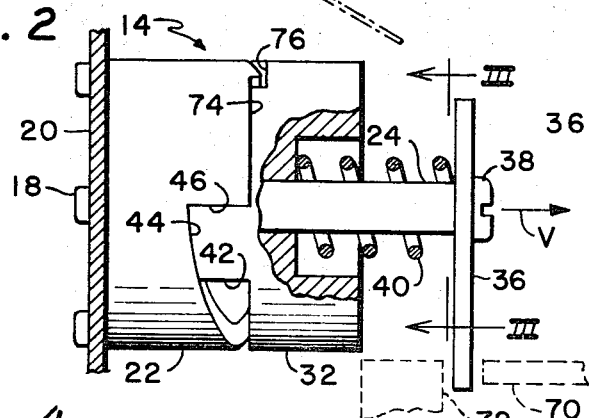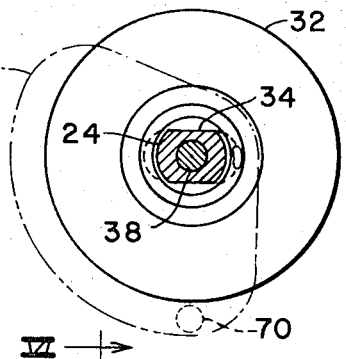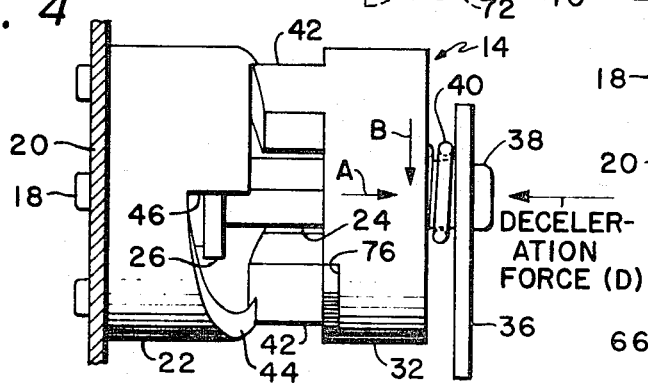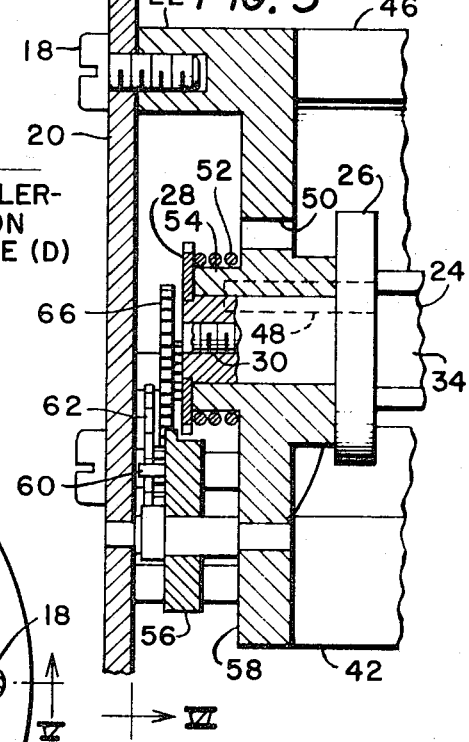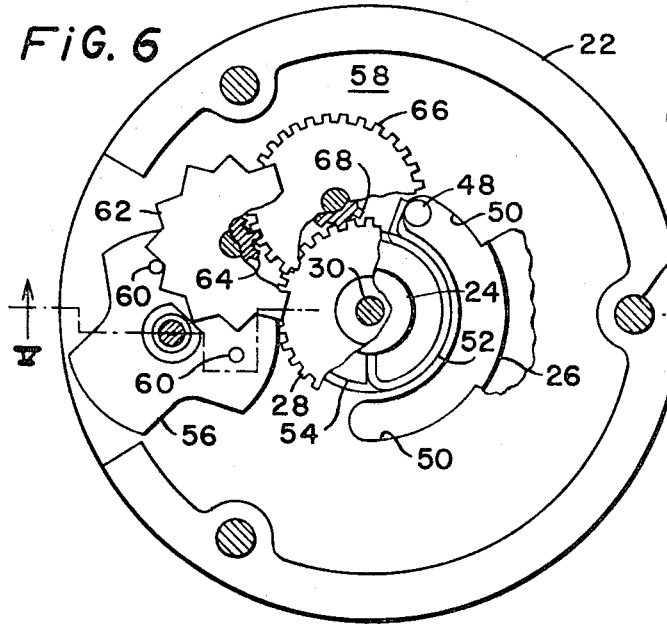
INVENTORS.
DONALD A. BRACKMAN
JOHN D. YORK
ATTORNEY.

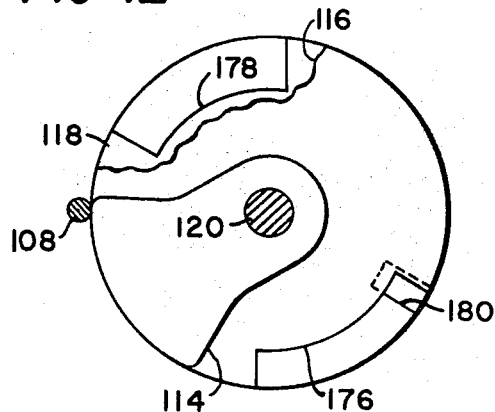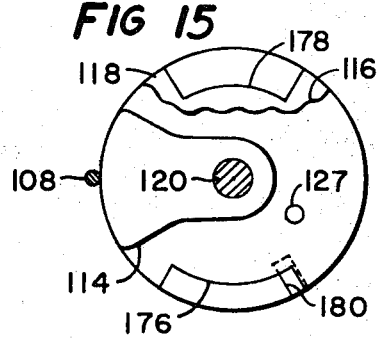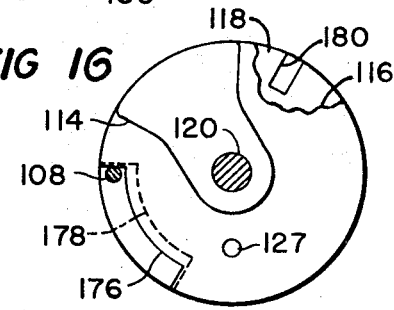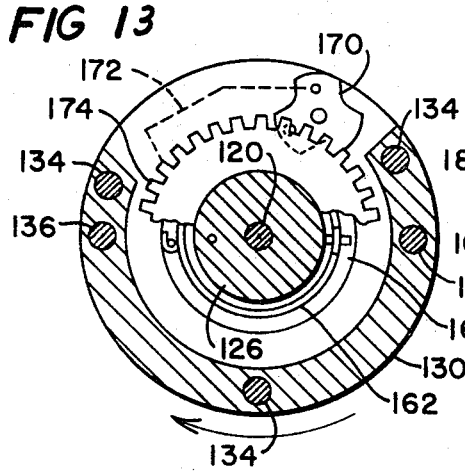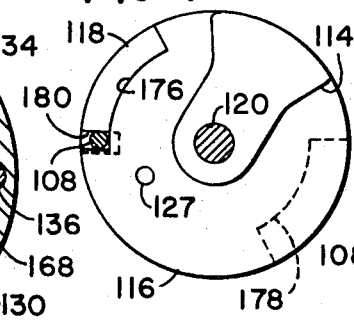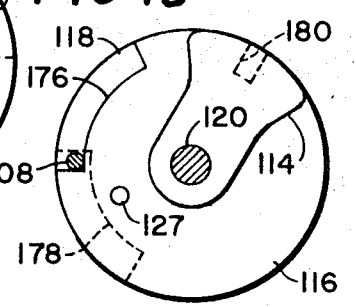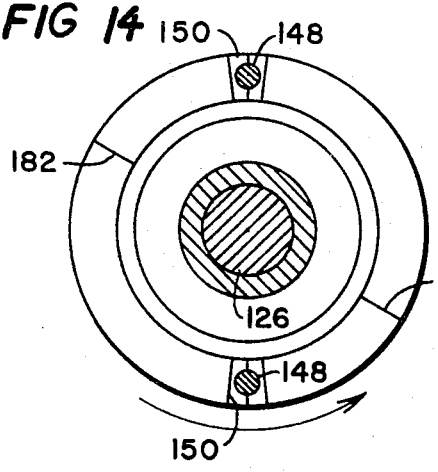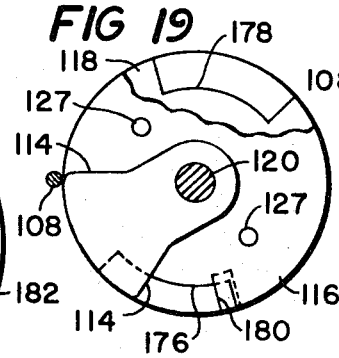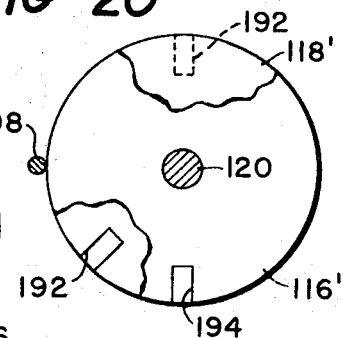

United States Patent Office 3,614,930
Patented Oct. 26, 1971

3,614,930
RATE CHANGE DEVICES AND PARTICULARLY
IMPROVED ARMING DEVICES
Donald A. Brackman, Englewood, Ohio, and John Donald
York, Connersville, Ind., assignors to Avco Corporation, Richmond, Ind.
Filed Dec. 23, 1968, Ser. No. 785,933
Int. Cl. F42c 15/12, 15/24, 15/26
U.S. Cl. 102—76 R                                21 Claims

ABSTRACT OF THE DISCLOSURE

The disclosure shows two forms of arming devices for bombs having retarder fins. In both devices a G weight is relatively rotated when displaced by a deceleration force. If the deceleration force is maintained for a predetermined period of time, in one device, the bomb is armed, otherwise it is not. In the second device, if the deceleration force is maintained for a predetermined period of time, the bomb is armed in a relatively short period of time, otherwise the bomb is armed in a longer period of time. In the second device, a second G weight provides bidirectional responsiveness to deceleration forces or optionally responsiveness to both acceleration and deceleration forces.

---

The present invention relates to improvements in rate of change devices, as accelerometers and decelerometers, and in its more specific aspects to improvements in ordnance, in safety and arming devices, which are responsive to acceleration and deceleration forces.

The present invention was particularly motivated by the requirements for safely arming bombs which are dropped from aircraft in low level flight. To assure a safe distance from the aircraft before detonation, such bombs are provided with retarder fins which are deployed to slow the latter portion of the bombs fall while still assuring accuracy in hitting a specified target.

If the retarder fins fail to function properly, it is essential that the bomb be armed in a longer period of time or be maintained in a safe or unarmed condition, dependent upon the particular military mission. One characteristic of proper operation of these retarder fins is that their deployment results in an axial deceleration force loading on the bomb for a finite period of time. If the retarder fins fail to function properly, either a threshold force level is not attained, or if attained, is not maintained for the length of time associated with proper retardation.

These relations have been recognized and arming devices have been devised to sense proper operation of such retarder fins. Such earlier devices have, however, been relatively large, expensive and heavy.

Accordingly, one object of the present invention is to make significant reductions in the cost, weight and size of such arming devices.

Recognizing that different types of missions and ordnance designs have different arming requirements, and that logistics problems are complicated by having single purpose arming devices, another object of the invention is to provide a multipurpose arming device and particularly to provide such devices at a cost economically attractive to reduce the logistics problems in supplying several single purpose arming devices.

Another object of the invention is to provide an arming device responsive to acceleration forces as well as or in addition being responsive to deceleration forces.

A further and broader object of the invention is to provide an improved device for sensing rate of change in movement, i.e. acceleration or deceleration, as a combined function with a time factor.

These ends are broadly attained through the use of a device in which a G weight is biased into engagement with a base member by resilient means. Acceleration or deceleration forces can disengage the G weight whereupon there is relative rotation between the base member and G weight by means providing a controlled rate of rotation. The extent of relative rotation indicates the time period during which acceleration or deceleration forces have been sustained.

In an arming device a predetermined angular extent of relative rotation is employed to arm a bomb or other ordnance.

In accordance with one feature of the invention, the arming device returns to its initial safe position if a deceleration or acceleration force is not maintained for a time period sufficient to indicate proper functional environment, e.g. deployment of retarder fins. If the arming device is subjected to a force insufficient to disengage the G weight, it will be returned to its initial position, serving as a safety device, and be operable at a later time in arming a bomb if its retarder fins have been properly deployed. This feature is also important in close tactical support operations in that the bomb will not be armed if its retarder fins are not properly deployed.

An alternate feature causes arming of the bomb in a longer period of time in the event of retarder fin malfunction.

Yet another feature is found in the provision of two G weights which may be responsive to deceleration (or acceleration) in either axial direction, permitting an arming device to be mounted in either the nose well or tail well of a bomb. Alternately, this feature permits the sequential sensing of an acceleration and then a deceleration force for given time periods as a condition to arming a bomb or other ordnance device.

Another feature of the invention is found in mounting this arming device on a timer shaft which is set in motion upon dropping of a bomb. Means are provided for arming the bomb a predetermined time after free fall release, or in the event of proper deployment of retarder fins, arming of the bomb in a shorter time.

The above and other related objects and features of the invention will be apparent from the following description of the disclosure found in the accompanying drawings and the novelty thereof pointed out in the appended claims.

In the drawings:

FIG. 1 is a simplified showing of a bomb of the type in which the invention has particularly novelty;

FIG. 2 is an elevation view of an arming device, embodying the present invention, in its safe position;

FIG. 3 is a sectional view taken on line III—III in FIG. 2;

FIG. 4 is a view showing the device of FIG. 2 in its armed position;

FIG. 5 is a sectional view on an enlarged scale, taken on line V—V in FIG. 6, of an escapement mechanism employed in this arming device;

FIG. 6 is a sectional view taken on line VI—VI in FIG. 5;

FIG. 7 is an end view of an arming device employing another embodiment of the invention;

FIG. 8 is an elevation view of this device;

FIG. 9 is an enlarged view of the deceleration responsive portion of this device;

FIG. 10 is a longitudinal sectional view of the deceleration responsive portion seen in FIG. 9;

FIG. 11 is a view taken on line XI—XI in FIG. 9;

FIG. 12 is a sectional view taken on line XII—XII in FIG. 9;

FIG. 13 is a sectional view taken on line XIII—XIII in FIG. 9;

FIG. 14 is a sectional view taken on line XIV—XIV in FIG. 9;

FIGS. 15–19 are sectional views similar to FIG. 12, but on reduced scale, illustrating various output functions; and FIG. 20 is a view similar to FIGS. 15–19 and illustrating another embodiment of the invention.

FIG. 1 shows a bomb 10 having retarder fins 12 which are illustratively shown in their deployed position by phantom lines. The location of the safing and arming device 14, now to be described is shown to be in the nose well of the bomb within its ogive 16.

The arming device 14 (FIGS. 2–6) is mounted, by screws 18, on a relatively fixed plate 20, within the nose well of the bomb 10. The screws 18 are threaded into a carrier or base member 22. A shaft 24 is journalled in base member 22 (FIG. 5) being axially fixed by a shaft flange 26 and a gear 28 secured to the rear end of the shaft by a screw 30. A G weight 32 is slidably mounted on the shaft 24, having an opening with sides engaging flats 34 formed on the shaft to prevent rotation of the G weight 32 relative to the shaft.

An output plate 36 is secured to the outer or forward end of the shaft 24 by a screw 38. A compression spring 40, acting against the output plate 36, resiliently holds the G weight 32 in engagement with the base member 22. The G weight 32 is provided with feet 42 which bear against camming surfaces 44, formed on the base member 22. The spring 40 normally forces the feet 42 against the camming surfaces 44 causing the G weight to have an initial angular position, relative to the base member which is established by engagement of the feet 42 with stops 46 formed at the inner ends of the cam surfaces 44. In one sense this can be described as detent means establishing an initial relative position between the G weight 32 and the base member 22.

The means now to be described rotate the G weight 32, relative to the base member 22, when the G weight is disengaged from the base member as later explained. A pin 48 (FIGS. 5 and 6) projects from the shaft flange 26 through an arcuate slot 50 in the base member 22. One end of a torsion spring 52 is hooked around this pin while its other end is anchored in an integral base member sleeve 54 forming a portion of the journal for the shaft 24. The spring 52 thus urges shaft 24 (and G weight 32) to rotate in a relative clockwise direction as viewed in FIG. 6 and in a relative counterclockwise direction as viewed in FIG. 3.

When such rotation occurs, its rate is controlled by an escapement mechanism comprising a pallet 56 pivotally mounted between the frame plate 20 and a recessed wall 58 of the base member 22, as shown in FIG. 5. The pallet 56 has pins 60 which are alternately engageable with a star wheel 62. A pinion 64 is formed below the star wheel 62 and meshes with a gear 66. A pinion 68 is formed beneath the gear 66 and meshes with the gear 28, secured to the shaft 24. The star wheel and gear pinion train to the shaft gear 28 are likewise journalled between the frame plate 20 and base member wall 58.

The initial or "safe" position of the arming device 14 is illustrated in FIGS. 2 and 3. In this position, the output plate 36 is interposed between a schematically depicted firing pin 70 and primer charge 72, preventing contact therebetween.

With the arming device positioned in the bomb 10, as indicated in FIG. 1, when the bomb is released from an aircraft it will accelerate to a velocity indicated by arrow V in FIG. 2. When the fins 12 are deployed, the device will be subjected to a deceleration force denoted by the arrow D in FIG. 4.

This deceleration force will cause the G weight 32 to be displaced axially in the direction of arrow A in FIG. 4, against the resilient force of spring 40. Upon such axial displacement of the G weight, the detent means including feet 42 are released and relative rotation of the G weight is initiated in the direction of arrow B in FIG. 4.

If the deceleration is maintained at a sufficient level and for a sufficient length of time to indicate proper deployment of the retarder fins 12, the end position of FIG. 4 is reached. In this position of approximately 120 degrees rotation, the output plate (FIG. 3) is swung clear of the firing pin 70 and the bomb is thus armed. Detonation of the primer charge 72, by the firing pin 70 may be carried out in many ways as by an impact force on the firing pin when the bomb strikes its target. It will be noted that the outer ends of the cam 44 drop off to flats 74 to maintain the G in its armed position, once it is reached. Slots 76 in the G weight 32 receive the projecting ends of the cam surfaces, in the safe position of the device as is seen in FIG. 2.

If the fins 12 do not provide the proper retarding action, the necessary deceleration force will not be sustained for a period sufficient for the described arming position of FIG. 3 to be reached. In this event the output plate will remain interposed between the firing pin and primer and the bomb will not detonate upon impact with the ground. This is of particular importance in close tactical support missions where explosion of a bomb after failure of the retarder fins could cause casualties to the releasing aircraft or the support forces.

Another advantage of this feature is that it not only serves as a safety device but retains the original function capability of the arming device. That is the chance of inadvertent force loadings for a time period sufficient to bring the device to an armed position use so remote as to be a practical impossibility. On the other hand, short term force loadings which might cause rotation of the G weight 32 have no effect on the primary function of the arming device, in that the G weight is returned to its initial position by the spring 40.

The springs 40 and 52, as well as the dynamics of the escapement and the mass of the G weight, may be selected to give the desired deceleration force levels and time constants for a given bomb configuration or mission requirement.

It will also be apparent that the described arming functions could be performed in response to an acceleration force as where the arming device is employed in other ordnance as a projectile or missile.

Reference is made to FIGS. 7–19 for a description of another embodiment of the invention. To set the environment, a primer charge 100 is mounted in a pivoted slider 102 (FIGS. 7 and 8). The slider is mounted between a pair of frame plates 103, 104 and held in its illustrated position by a D shaft 106 journaled in the lower plate 104. The D shaft 106 is held in its locking position by a release arm 108 which bears against an arming device 110 which will be described in detail below. When the arming mechanism 110 permits the release arm 108 to pivot in a counter-clockwise direction (FIG. 8), the slider 102 is released and pivoted, by a torsion spring (in the hub of the slider), to bring the primer 100 into registration with a lead passageway 112. The bomb is then armed and the primer charge 100 may be fired by known means.

The arming device 110 comprises three discs which control pivotal movement of the release arm 108 and thus the time period within which the bomb will be armed after being dropped from an aircraft. These control discs (FIGS. 9 and 12) comprise a safety disc 114, a timing disc 116 and a retard-adjust disc 118. The entire arming device 110 is mounted on and rotates with a timer output shaft 120. Upon release of the bomb, known mechanisms are actuated to actuate rotation of this shaft at a fixed rate. As is more fully described hereinafter, the discs 114, 116 and 118 bring slots formed thereon into registration with the release arm 108 permitting it to pivot under the influence of spring means 122 which are schematically illustrated in FIG. 7.

The safety disc 114 is secured to the shaft 120 by a clutch sleeve 124 which is threaded thereon. The timer disc 116 is secured to the upper end of a shaft 126 in an angularly fixed position by pins 127, the shaft 126 is coupled to the timer shaft 120 through a coil spring 128 having one end anchored in the shaft 126. This arrangement provides a one way clutch drive connection, through clutch sleeve 124, with the timer shaft 120.

The retard-adjust disc 118 is formed integrally with a housing 130. A cam cylinder 132 is secured to the lower end of the housing 130 by screws 134, being accurately positioned by dowel pins 136. The assembly comprising the housing 130 cam cylinder 132 may be considered a base member and is rotatable on shaft 126 in a controlled fashion later explained. This assembly is held in a fixed axial position on the shaft 126 between a shaft collar 138 and a lower cam cylinder 140 which is secured to the shaft 126 by a pin 142.

A pair of G weights 144, 146 are slidably mounted on the hubs of cam cylinders 132 and 140 respectively. Pins 148 project upwardly from the G weight 144 for engagement with notches 150 formed on the cam plate 132. Similarly pins 152 project downwardly from G weight 146 for engagement with notches 154 formed on the lower cam cylinder 140. The G weights 144, 146 are urged apart by a compression spring 156 thereby yieldingly maintaining the pins 148, 152 in engagement with the notches on cam cylinders 132, 140 respectively. Thus the several elements on the shaft are resiliently maintained in fixed relative angular positions.

The G weights 144, 146, are held against relative rotation by pins 158 extending from each G weight and slidably received by holes in the other G weight. Spring loaded balls 160 bear against the pins 158 for purposes later described.

The adjust disc 118 rotates relative to the timing disc 116 when a sufficient deceleration force has been imposed. A torsion spring 162 is provided to rotate the housing 132 (and disc 118) relative to the shaft 126 (and disc 116). The spring 162 is anchored at one end to a pin 166 projecting from the shaft 126. The cam plate 132 is relieved at 168 to permit rotation relative to the pin. The other end of the spring 162 is anchored to the cam plate 132.

When the G weight 144 is displaced downwardly the pins 148 clear the detent notches 150 and the spring 162 will rotate the cam plate 132 and housing 130 in a clockwise direction relative to the shaft 126 as indicated by arrows in FIGS. 9 and 13. When the G weight 146 is displaced upwardly, the pins 152 clear the notches on the lower cam plate 140 and the spring 162 can likewise rotate the housing 132 in the same clockwise direction relative to the shaft 126. When the G weight 146 is so displaced the two G weights 144, 146 are locked to and rotate with the housing 132.

The rate of rotation of the housing 132 relative to the shaft 126 is controlled by an escapement including a pallet 170 (FIG. 13) pivotally mounted between the cam plate 132 and housing 130. The escapement includes a star wheel and gear train of the type more fully described in connection with the embodiment of FIGS. 1-6 and indicated by broken line 172 in FIG. 12. The output pinion of the gear train 172 meshes with a gear 174, secured to the shaft 126.

Thus the described escapement connection with gear 174 and spring 162 provide a controlled rate of rotation when one or the other of the G weights 144, 146 is displaced to actuate rotation of the retard-adjust disc. It will also be noted that this controlled rate of rotation is maintained between the pins 148 and cam cylinder 132 or pins 152 and cam cylinder 140 dependent on which G weight is displaced.

To further describe the operation of the present arming device, it will first be assumed the device is mounted in the nose well of a bomb having retarder fins and that when the retarder fins are displayed, the bomb will be subjected to deceleration forces in the direction of arrow A (FIG. 9).

The initial setting of the discs 114, 116 and 118 is shown in FIG. 12. Upon release from the aircraft, all three discs rotate simultaneously with the timer output shaft 120 which has been automatically actuated, as previously described. This initial rotation is shown in FIG. 15. When the retarder fins are deployed and function properly, the deceleration force A will be sustained for a predetermined length of time, and the G weight 144 will be displaced so that the pins 148 are clear of the notches 150 (in cam cylinder 132) permitting the retard-adjust disc 118 to rotate 180 degrees relative to the timing disc 116, bringing the end position seen in FIG. 16. In this position slots 176, 178 of discs 116, 118 respectively overlap, permitting counter-clockwise rotation of the release rod 108, causing the bomb to be armed.

In the event the fins malfunction either the threshold G loading will not be attained or will not be maintained for a length of time sufficient for completion of the 180 degree rotation required for the adjust cycle. If the threshold G loading is not attained, the pins 148 simply remain in the notches 150. A slot 180, in the adjust disc which underlies the timing disc slot 176, registers with a release rod 108 in a longer period of time, as illustrated in FIG. 17. If the G loading is not sustained for a sufficient length of time, spring 156 will cause the pins 148 to engage the sloping cam surfaces leading to a low point 182 (FIGS. 9 and 14). This causes the adjust disc 118 to be brought to a predetermined position (FIG. 18) in which the opposite end of the slots 176, 178 overlap thus permitting arming of the bomb in an intermediate period of time consistant with partial retardation.

The spring loaded balls 160 (FIG. 10) engage the ends of pins 158 once the pins 148 have been forced into the low points 182 of the cam cylinder 132. This positively prevents further relative rotation once there has been a failure to sense complete retardation.

Alternately, assuming that the arming device had been mounted in the tail well of a bomb the same output functions, described above will be provided. This multi-purpose meature is provided by the lower G weight 146. With a tail mounted arming device, the deceleration force of retardation will be in the opposite direction of arrow A. The G weight 146 would be displaced in an upwardly direction disengaging pins 152 from the notches 154. The housing 130 and integral retard adjust disc 118 rotate, as previously described, to give the same output functions as those described in connection with displacement of the G weight 44. In this connection the cam cylinder 140 has low points 184 to provide an intermediate arming time as described in connection with FIG. 18.

In actual operation it is necessary or desirable to vary the arming time as a function of the scheduled altitude of the aircraft in a given bombing mission. The one way clutch, including spring 128 (FIG. 10) is provided for such purposes. The lower end of the shaft 126 is journaled in a frame plate 186. A knob 188 is secured to the shaft 126 below the plate 186. Indicia 190 (FIG. 11) are provided on the plate 186 to indicate time increments for arming of the bomb.

The knob 188 is rotated, before installation of the arming device in the bomb, to set the proper arming time of the bomb for a free fall drop without retardation. In making this adjustment, all components of the device 110 are rotated reative to the timer shaft 120, except for the safety disc 114 which is secured directly thereto. FIG. 19 illustrates an adjustment made for a shorter arming time.

The safety disc provides two functions. First, it prevents inadvertant arming when making a timing adjustment. Secondly, it establishes a minimum arming time. This latter function can be seen from FIG. 19. If retardation were to occur immediately upon bomb release, the slots 176, 178 would be brought into registration and arming would occur when their leading edges reached the rod 108. The safety disc overlies a portion of these registered slots and thus prevents arming movement of the rod 108 for the fixed minimum time required for the safety disc to rotate past the rod 108.

From the above it will be apparent that the arming device is set to arm the bomb in the proper time for a free fall without retardation. If retardation occurs then the arming time is reduced by a fixed amount.

This leads to another multipurpose feature that is inherent in the present device, namely the arming of free fall bombs which are not designed for retardation. This function is provided in the same way as described above where retarder failure does not produce a sufficient decelertion force to disengage the pins 148 from the notches 150. The adjust disc slot provides the free fall arming function (FIG. 17).

The attractiveness of this device for multi-purpose use is enhanced by its compactness and economical construction. The latter feature is largely attributed to the fact that the cam cylinder 132 and 140 are identical in configuration as are the G weights 144 and 146.

With minor modifications the device 110 may be sequentially responsive to acceleration and deceleration forces. This type of arming device could be used in a projectile which is fired from a gun and then retarded before impact on a target. A modified adjust disc 118' (FIG. 20) is provided with a single slot 192 and a modified timing disc 116' is provided with a single slot 194. The rotation rate of the shaft 126 is set so that less than 180 degrees of rotation will occur during the duration of the acceleration force. Finally, the lock mechanism of the spring loaded balls is removed.

With these modifications an acceleration force in direction of arrow A will displace G weight 144 and result in a 120 degree rotation of disc 118' relative to disc 116' bringing slot 192 to its phantom position. A later deceleration force in the direction opposite arrow A will displace G weight 146 resulting in a further 180 degrees of relative rotation bringing the slots 192, 194 into registration to later permit arming movement of rod 108. Thus both acceleration and deceleration forces are required before arming can occur.

It will be apparent that various output functions can be devised by the design of the output discs and the cam cylinders 132 (140). Likewise electrical outputs can be provided as a function of the relative angular movement between the G weight and base member.

It will also be apparent that the broader aspects of the invention are not limited to arming devices for bombs and apply to motion responsive devices generally. Thus accelerometers or decelerometers may embody many features of the invention and may be used for many purposes. The scope of the present inventive concepts is therefore to be derived solely from the following claims.

Having thus described the invention what is claimed as novel and desired to be secured by Letters Patent of the United States is:

1. A motion rate change device comprising:
   first and second members having an initial relative angular position,
   means for mounting said first and second member in axially displaced alignment,
   means for relatively rotating said members at a controlled rate,
   a G weight axially disposed between said members and being angularly positioned relative to one of said members, and
   resilient means urging said G weight into engagement with one of said members and preventing said rotation,
   whereby when said G weight is displaced by a motion rate change force, against the action of said resilient means, the first and second members will be relatively rotated at the controlled rate and the angular extent of rotation will represent the time during which such a force loading has been sustained.

2. A motion rate change device as set forth in claim 1 further comprising actuating means responsive to a predetermined extent of said relative rotation.

3. A motion rate change device as set forth in claim 2 wherein:
   said resilient means maintains said G weight in engagement with said one member until a threshold force level is sustained, and
   said device further includes:
      means for preventing said predetermined extent of relative rotation in the event said threshold force level is not maintained for a predetermined period of time.

4. A motion rate change device as set forth in claim 1 further comprising:
   a second G weight resiliently urged into engagement with the other of said member in a direction opposite that in which the first G is urged and also preventing said relative rotation when so engaged,
   whereby when the second G weight is displaced by a motion rate change force and disengaged from said second member, the first and second members will then be relatively rotated.

5. A modern rate change device as set forth in claim 1 wherein:
   said mounting means is a shaft axially extending from one of said members on which the G weight is mounted,
   the rotating means include a torsion spring effective between said shaft and the other member and an escapement mechanism connected at one end to said shaft and at its other end to said other member to provide a uniform rate of relative rotation between the two members.

6. An arming device, for an ordnance item, including a motion rate change device as in claim 1 and further including:
   means for arming the ordnance item in response to a predetermined extent of relative rotation of the first and second members.

7. An arming device as set forth in claim 6 further comprising:
   means for returning said first and second members to their initial relative positions if the duration and magnitude of the force loading are less than predetermined values.

8. An arming device as set forth in claim 6 further comprising:
   a second G weight resiliently urged into engagement with the other of said members in a direction opposite that in which the first G weight is urged and also preventing said relative rotation when so engaged,
   whereby the arming device may be mounted in the nose well or tail well of an ordnance item and be actuated by acceleration or deceleration forces in either direction as desired.

9. An arming device as set forth in claim 6 further comprising:
   a second G weight resiliently urged into engagement with the other of said members in a direction opposite that in which the first G weight is urged and also preventing said relative rotation when so engaged,
   said first and second members being relatively rotated a first increment upon disengagement of said first G weight for a predetermined time and a second increment upon disengagement of said second G weight for a predetermined time.
   said arming means being actuated in response to both increments of movement,
   whereby the ordnance item will be armed after sustaining to both acceleration and deceleration forces of a given magnitude and time duration.

10. A motion rate change device comprising:
   first and second members having an initial relative angular position, said first member including a shaft on which said second member is rotatable, means for relatively rotating said members at a controlled rate,
a first G weight,
a second G weight,
said G weights being disposed between said first and second members,
means for preventing relative rotation between said G weights,
and a compression spring between said G weights for respectively urging each G weight into engagement with said first and second members for preventing rotation of said members,
whereby when said first and second G weights are displaced by a motion rate change force against the action of said spring, the first and second members will be relatively rotated and the angular extent of rotation will represent the time during which such a force loading has been sustained.

11. A motion rate change device comprising:
first and second members having an initial relative angular position,
means for relatively rotating said members at a controlled rate,
a first G weight,
resilient means urging said G weights into engagement with one of said members and preventing said rotation,
a second G weight resiliently urged into engagement with the other of said member in a direction opposite that in which the first G weight is urged and also preventing said relative rotation when so engaged,
whereby when said G weights are displaced by a motion rate change force against the action of said resilient means, the first and second members will be relatively rotated and the angular extent of rotation will represent the time during which such a force loading has been sustained, and
actuating means responsive to relative rotation of the first and second members resulting from disengagement of both G weights responsive to sequential motion rate change forces in opposite directions.

12. An arming device for an ordnance item comprising:
a base member,
a shaft journaled on said base member,
a G weight, said G weight being slidable on said shaft and held in fixed angular relation thereto,
an arming disc secured to the outer end of the shaft, said disc and base member having an initial relative angular position,
a compression spring acting against the arming disc and resiliently urging the G weight into engagement with the base member,
cam means establishing the initial position of the G weight and base member as the G weight engages the base member,
a torsion spring effective between the base member and shaft with escapement mechanism providing a uniform controlled rate of relative rotation when the G weight is disengaged from the base member by a motion rate change force wherein the arming disc will rotate a predetermined angular extent if the motion rate change force is sustained for a given period of time,
said cam means being formed to return said G weight to its initial position by the action of said compression spring if said force level drops below a given level prior to the disc reaching an arming position, and
means for arming the ordnance item in response to a predetermined extent of relative rotation of the arming disc and base member.

13. An arming device for an ordnance item comprising:
first and second members having an initial relative angular position,
means for relatively rotating said members at a controlled rate,
a G weight,
resilient means urging said G weight into engagement with one of said members and preventing said rotation,
whereby when said G weight is displaced by a motion rate change force, against the action of said resilient means, the first and second members will be relatively rotated and the angular extent of rotation will represent the time during which such a force loading has been sustained,
a timer having an output shaft which is set into rotation upon release of the bomb from an aircraft,
said first and second members respectively comprise a timer disc and retard adjust disc rotatable with said timer shaft,
means for arming the bomb in response to rotation of said discs in a period of time commensurate with a given angular movement of said discs with said timer shaft, said period being the desired time for arming in a free fall mission, and
said arming means also being responsive to rotation of the retard adjust disc, relative to the timer disc, indicative that the G weight has been displaced by a motion rate change force to arm the bomb in a shorter period of time.

14. An arming device as set forth in claim 13 further comprising:
means for limiting the minimum time in which the bomb may be armed by operation of retarder fins.

15. An arming device as set forth in claim 13 further comprising:
a one-way clutch connection between said timer disc and timer shaft, and
means for rotating the timer disc relative to said timer shaft to vary the desired free fall arming time.

16. An arming device as set forth in claim 13 further comprising:
a shaft secured at one end to the timer disc in fixed angular relation and on which the G weight is slidable,
a base member engaged by said G weight and with which the adjust disc is integrally formed, said adjust disc being contiguous with said timer disc,
a torsion spring anchored at one end on said shaft and at its other end on said base member, and
an escapement mechanism between said base member and shaft to provide a uniform rate of rotation between said discs when said G weight is disengaged from said base member.

17. An arming device as set forth in claim 16 further comprising:
a flange secured to the other end of said shaft,
a second G weight slidable on said shaft,
means holding the G weights in fixed angular position,
a compression spring between said G weights and providing resilient means engaging them respectively with the base member and shaft flange.

18. An arming device as set forth in claim 17 wherein:
the G weights are identically formed,
the shaft flange is in the form of a cam cylinder,
an identical cam cylinder is secured to the base member for engagement by the first G weight.

19. An arming device as set forth in claim 13 wherein:
the arming means comprises a rod resiliently held against said discs in a safe position,
the timer disc and adjust disc have registered slot means which receive said rod in an arming position at the expiration of the free fall arming time and other slot means which receive said rod in an arming position in a shorter period of time upon rotation of said adjust disc relative to said timer disc as a result of bomb retardation.

20. An arming device as set forth in claim 19 further comprising:
a safety disc preventing said rod from being received in said slot means for a minimum period of time requisite for the timer shaft to rotate the safety disc past said rod.

21. A motion rate change device comprising:
a first fixed member having an engaging surface,
a second member having an engaging surface,
a shaft in concentric relation to both of said members, said respective engaging surfaces being formed to cooperatively coact to prevent rotation of the second member when the second member is pressed against the first member,
spring means for biasing the second member against the first member, said second member being keyed to the shaft so that in response to the presence of motion rate change forces the second member is disengaged from the first member and is free to rotate, and
a clock mechanism for rotating said second member relative to the first as long as the motion rate change forces are sufficient in duration to maintain the disengagement of the members, whereby the total angular displacement of the members relative to each other is a measure of the duration of the motion rate change forces.

References Cited

UNITED STATES PATENTS

| | | | |
|---|---|---|---|
| 2,789,508 | 4/1957 | Rove et al. | 102—83 |
| 2,836,118 | 5/1958 | Hjelm | 102—82 X |
| 2,845,024 | 7/1958 | Green | 102—84 X |
| 2,863,393 | 9/1958 | Sheeley | 102—76 X |

BENJAMIN A. BORCHELT, Primary Examiner

T. H. WEBB, Assistant Examiner

U.S. Cl. X.R.

102—82, 84